Oct. 23, 1923.

M. M. COREY

GATE CLOSING DEVICE

Filed Oct. 6, 1922

1,471,830

INVENTOR
Melvin M. Corey
BY
Adam E. Fisher
ATTORNEY

Patented Oct. 23, 1923.

1,471,830

UNITED STATES PATENT OFFICE.

MELVIN M. COREY, OF SWEETGRASS, MONTANA.

GATE-CLOSING DEVICE.

Application filed October 6, 1922. Serial No. 592,687.

*To all whom it may concern:*

Be it known that I, MELVIN M. COREY, a citizen of the United States, and a resident of the city of Sweetgrass and State of Montana, have invented new and useful Improvements in Gate-Closing Devices, of which the following is a specification, reference being had to the accompanying drawings.

This invention is a gate closing device, and the object is to provide a simple and practical attachment for gates hung to swing in both directions, and which will cause the gate automatically to close after being opened.

Figure 1:
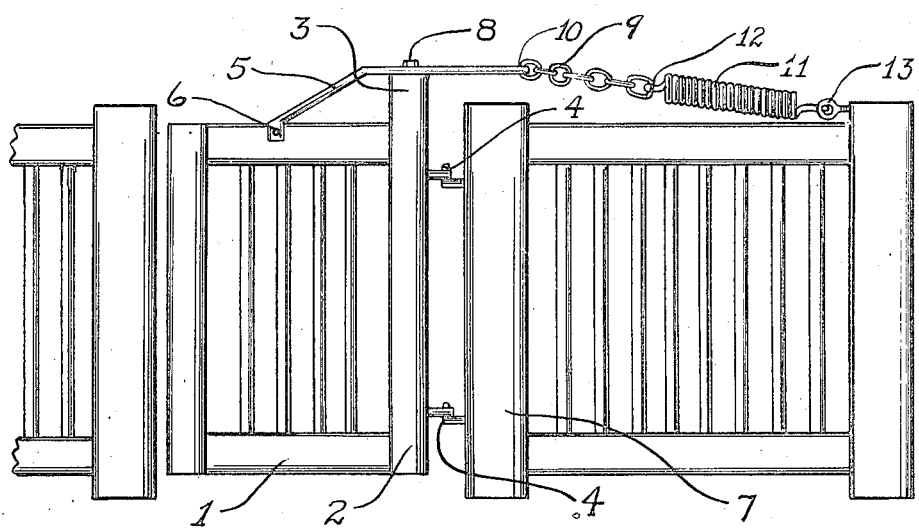
Figure 1 is a side elevation.
Figure 2:
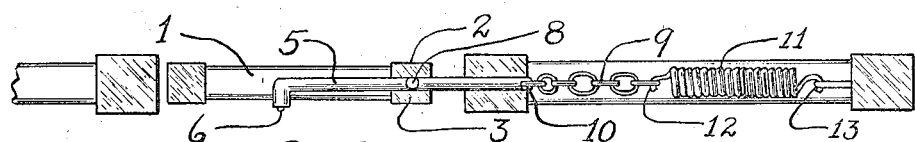
Figure 2 is a top view.

The invention consists in providing for the ordinary gate 1, the back bar 2 which is extended upwardly as shown at 3, and which gate is hung on the pivots 4 so as to swing open in either direction, a draw-bar 5 attached to the top of the gate at the point 6, and thence extended angularly up to and over the top of the extension 3, at which point the bar is bent to a horizontal line and extended back over the gate-post 7. A screw or bolt 8 secures the bar to the top of the back bar 2. A chain 9 is attached at 10 to the free end of the draw-bar 5 and a retractile spring 11 is attached at 12 to the end of the chain, the opposite end of the spring being secured at a point 13 along the fence. The spring 11 being drawn taut, its action is to automatically close the gate, after the gate is opened in either direction. Of course the device would operate on a gate hung to swing open in one direction only.

While I have herein described a certain specific method of constructing and assembling the elements of my invention, it is understood same may be varied in minor details, not departing from the spirit of my invention as defined in the appended claims.

I claim:

1. A gate closing device for a gate having an upwardly extended back-bar; comprising a draw-bar having one end secured to the gate and the other end run up over the top of the back-bar and secured thereto, with the free end of the draw-bar extended over the gate post; a chain attached to the free end of the draw-bar; and a taut spring connecting the chain with the fence.

2. A gate closing device for a gate having an upwardly extended back bar, comprising a draw-bar secured to the top of the gate and over the back bar thereof, and extended back over the gate post; and a resilient element extended between the free end of the draw bar and the fence.

MELVIN M. COREY.

Witnesses:
J. M. DONLIN,
J. H. GUERIN.